United States Patent [19]
Trowbridge

[11] 3,933,213
[45] Jan. 20, 1976

[54] VARIABLE RESPONSE SNOWMOBILE SUSPENSION SYSTEM
[75] Inventor: Darrell L. Trowbridge, Fond du Lac, Wis.
[73] Assignee: Brunswick Corporation, Skokie, Ill.
[22] Filed: Apr. 11, 1974
[21] Appl. No.: 460,024

[52] U.S. Cl. .................................. 180/5 R; 305/24
[51] Int. Cl.² ......................................... B62D 55/08
[58] Field of Search ................ 180/5 R; 305/24, 27; 280/124 R; 267/20 R, 20 A

[56] References Cited
UNITED STATES PATENTS

| 3,603,575 | 9/1971 | Arlasky | 180/5 R |
| 3,613,811 | 10/1971 | Brandli | 180/5 R |
| 3,707,198 | 12/1972 | Pierson | 180/5 R |
| 3,727,709 | 4/1973 | Newman | 180/5 R |
| 3,744,583 | 7/1973 | Bedard | 180/5 R |
| 3,773,126 | 11/1973 | Irvine | 305/24 |
| 3,860,079 | 1/1975 | Hoffman | 180/5 R |

Primary Examiner—Philip Goodman
Assistant Examiner—John A. Carroll
Attorney, Agent, or Firm—William G. Lawler, Jr.

[57] ABSTRACT

The invention is a suspension assembly for a loop drive track of a vehicle such as a snowmobile. Individual forward and aft suspension linkages incorporating coaxial compression spring and shock absorber units, employ rolling contact with a track support slide rail or bogey wheel assembly to provide programmed spring and shock reaction over the full range of vertical displacement of the track.

17 Claims, 4 Drawing Figures

VARIABLE RESPONSE SNOWMOBILE SUSPENSION SYSTEM

BACKGROUND OF THE INVENTION

The invention is in the field of suspension systems for the endless tracks of track laying vehicles, more particularly relates to such a suspension system for the drive track of a snowmobile and still more particularly to what is known to the art as a slide rail suspension; however, the system is adaptable as well to a bogey wheel track support arrangement.

During the course of the development of the snowmobile vehicle, the track support element was initially provided with leaf, coil and torsion spring arrangements which were undamped and which due to their mounting and actuating mechanisms provided a rather stiff linear response to displacement of the track, leading to a comparatively rough ride. Later, separate shock absorbers were added usually inefficiently mounted at the rear of the track support frame where their action was not directly associated with the aforementioned spring support elements.

The invention is an improvement in such track suspension systems in that it not only employs matched coaxial spring and shock absorber units, but also includes actuating linkages therefore which provide a connection of variable mechanical advantage with the track support element. The net result is a suspension system that is more forgiving and softer in the early stages of its displacement and yet fully responsive to the more extreme displacement forces encountered in rough terrain and at high speed. Constant track tension through all articulations of the suspension is achieved through the front control arm configuration and angles disclosed.

BRIEF DESCRIPTION OF THE INVENTION

Briefly the suspension system of the invention comprises a track support element suspended within the tunnel of a typical snowmobile chassis by a pair of forwardly extending control arms which provide for generally arcuate up and down movement of the track support element within the tunnel. A front suspension for the track support element includes at least one spring/shock absorber unit and an actuating lever arm for the spring/shock unit connected between the track support element and the chassis. A frictionless contact, e.g. roller, mounted to the track support element engages the shock actuating lever at varying points along its length determined by the displacement of the assembly so as to vary the fulcrum of the lever and the mechanical advantage of the spring/shock linkage. A rear suspension for the track support element includes at least one similar rear spring/shock and lever arm assembly which connects to the chassis and is held in contact with the track support element by a low friction engaging means which also moves along the aft lever arm changing the fulcrum of the lever and the mechanical advantage of the aft suspension system as the track support element is displaced.

Among the advantages gained by the invention is the damping of straight upward thrust and the controlling of rebound of the machine upon encountering a bump; these thrusts and rebounds tend to throw the machine in the air and reduce traction and steerability. This advantage derives from the use of the forward shock absorber of the invention which controls such thrusts and rebounds by dampening the action of the forward support spring.

A further advantage of the invention is the achieving of an efficiency rate of between 75 and 103% at the spring/shock assembly through the use of the varying fulcrum point. As will be later described, the forward shock lever arm is given a cam shape which accelerates the action of the spring/shock assembly in the event of more extreme displacement of this track support unit.

A still further advantage of the invention is that it damps suspension swing, or "jacking", encountered upon the abrupt application of power, which swing can and has in the past resulted in the lifting of the front skis entirely off the surface with result of loss of steering control.

Yet another advantage of the invention is the improved comfort of the ride of the machine due to the varied mechanical efficiency of the suspension system which permits use of softer spring and shocks.

A still further advantage of the invention is in weight saving enabled by the use of lighter springs and the coaxial spring/shock assembly.

Other objectives, advantages, and various further features of novelty and invention will be pointed out or will occur to those skilled in the art from a reading of the following specification in conjunction with the accompanying drawings.

DETAILED DESCRIPTION OF THE DRAWINGS

Figure 1:
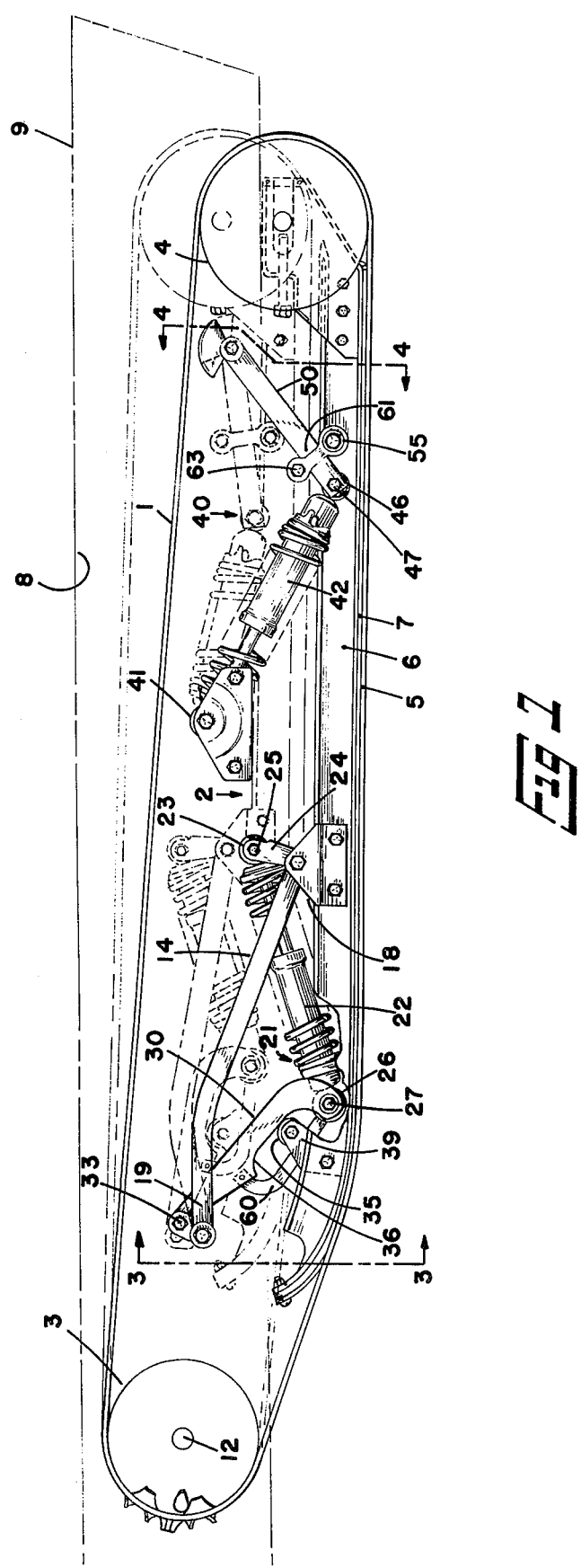
FIG. 1 is a side view of the suspension system of the invention when the snowmobile is at rest (solid lines) and with the suspension system near fully depressed (dotted lines).

Referring now to FIG. 1, a snowmobile drive belt 1 is shown mounted on a suspension system 2 of the invention. The belt is led over a drive sprocket 3 at its forward end and idler wheels 4 at its opposite end. The driving span 5 of the track rides along the bottom surface of a pair of slide rails 6 having a low friction material 7 positioned therebetween.

The entire assembly is positioned within a tunnel 8 in the chassis 9 of a snowmobile illustrated schematically in FIGS. 1, 2, 3 and 4.

Figure 2:
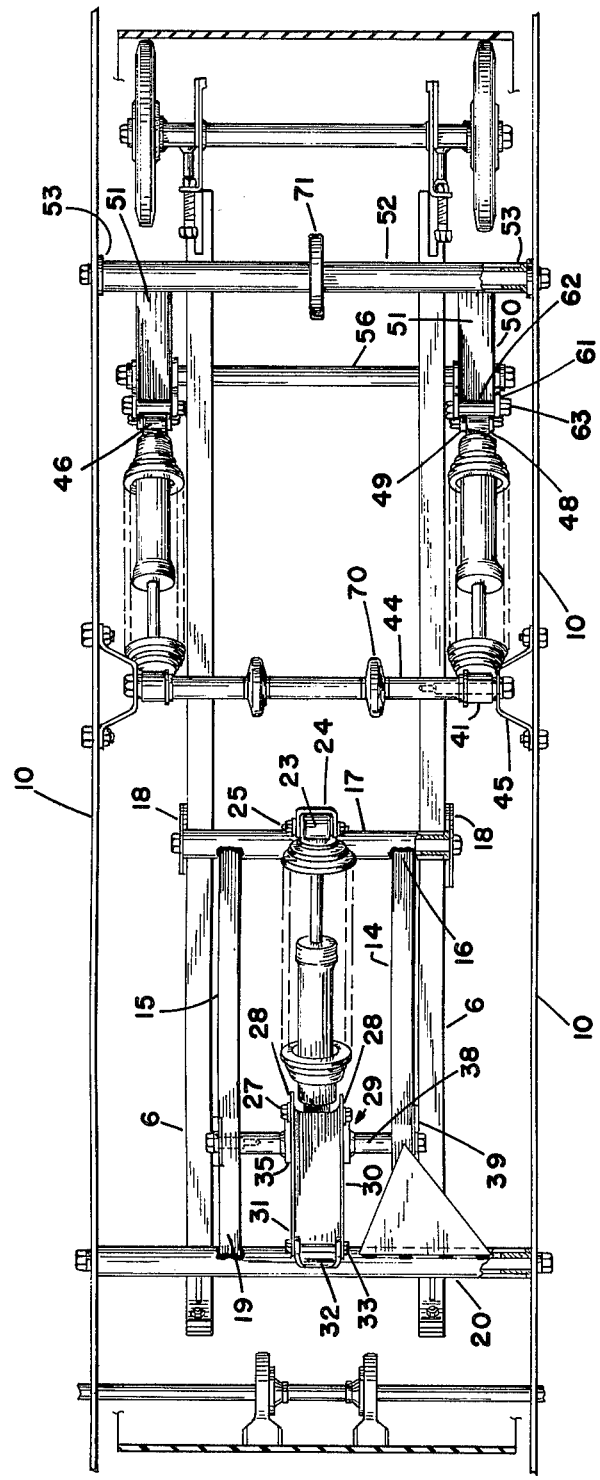
FIG. 2 is a top view of the track suspension system of FIG. 1.
Figure 3:
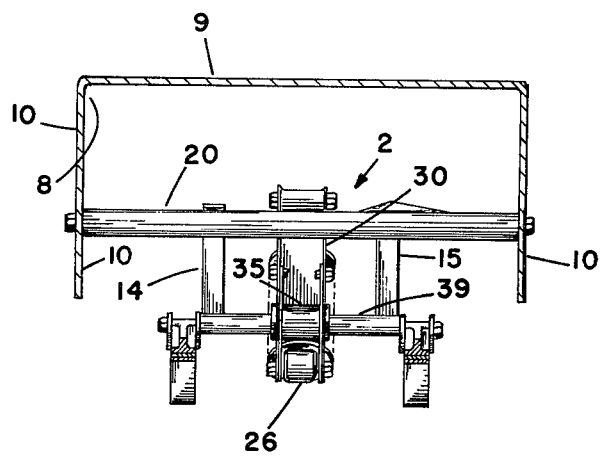
FIG. 3 is a front view of the forward suspension system of FIG. 1.

Referring to FIGS. 1 and 2, the axle 12 of the drive sprocket 3 is fixedly journaled to the snowmobile chassis 9. The slide rails 6 are pivotally attached to the chassis sidewalls 10 by a pair of suspension control arms 14 and 15. The after end 16 of each of the suspension arms 14 and 15 is rigidly connected to a transverse tubular member 17 which extends between and is pivotally connected to a pair of vertical mounting plates 18 extending upwardly from the outer sides of the two slide rails 6 respectively. The forward ends 19 of suspension arms 14 and 15 are rigidly attached to a transverse tubular member 20 which extends across the tunnel opening 8 in the chassis and is pivotally attached to the side walls 10 of the chassis. This connection basically permits the slide rails to move up and down in an arc prescribed by the after end of the suspension arms 14 and 15 and keeps the track length constant.

It is significant to note that the suspension arms 14 and 15 angle upwardly due to the fact that the transverse tubular member 17 is normally lower than the transverse tubular member 20. With the aft idler wheel 4 being rigidly attached to the slide rail assembly 2 rapid application of power will rotate the assembly downwardly about the forward transverse member 20 causing the forward end of the machine to unweight to a limited degree. This is considered desirable if controlled so that the skis remain in contact with the snow as it reduces friction on the skis and thereby promotes more rapid acceleration.

The forward spring/shock assembly 21 includes a forward coaxial compression spring and shock absorber assembly of a type well known to the art and frequently used on motorcycles, having an after eye 23 attached within a clevice 24 by a removable screw and nut 25. The clevice 24 is rigidly attached to the pivoting transverse tubular member 17 so that it will rotate therewith. The forward end of the spring/shock assembly 22 has a similar attaching eye 26 which is pivotally attached by a screw and nut 27 between the downwardly extending side walls 28 of the after end 29 of a forward shock absorber actuating lever arm 30. The forward end 31 of the lever arm 30 is pivotally attached by a pin 33 to a clevice 32 rigidly mounted on transverse tubular member 20.

The forward spring/shock assembly 21 is actuated by the upward thrust of the slide rails 6 which is transmitted by a roller 35 bearing upwardly against a cam surface 36 on the underside of the forward actuating lever arm 30. The roller 35 is journaled upon a transverse tubular member 38 which is pivotally mounted between a pair of vertically extending mounting plates 39 extending upwardly from the inner sides of the slide rails 6. As illustrated in FIG. 1, as the slide rails are urged upwardly against the suspension system the roller 35 moves toward the forward end of the lever arm 30 thereby increasing the mechanical advantage of the spring/shock mechanism and gradually stiffening the suspension in response to further displacement. The net effect of the linkage, however, is to provide a considerable latitude of movement with light springing in the early stages of displacement to provide a smoother ride. It should be noted that the combination of the forward suspension arms 14 and 15, the transverse tubular member 17 and the clevice 24 combine to function as a bell crank which compresses the spring/shock assembly 22 further increasing its effectiveness as the slide rails 6 are moved upwardly.

The aft spring/shock suspension assembly 40 is comprised of two identical units, one on the outside of each slide rail, so that only one assembly need be described. The forward mounting eye 41 of each aft spring/shock unit 42 is pivotally attached to a tubular transverse structural member 44, which member is pivotally attached to the side walls 10 of the snowmobile chassis by a suitable means such as the stand off brackets 45 illustrated. The rear mounting eye 46 of the spring/shock assembly 42 is pivotally attached by a bolt and bushing assembly 47 between the upwardly extending side walls 48 of the forward end 49 of the after shock control lever arm 50. The after end 51 of the lever arm 50 is rigidly attached to a tubular transverse structural member 52, the ends 53 of which are pivotally attached by means such as that illustrated to the side walls 10 of the chassis 9.

Figure 4:
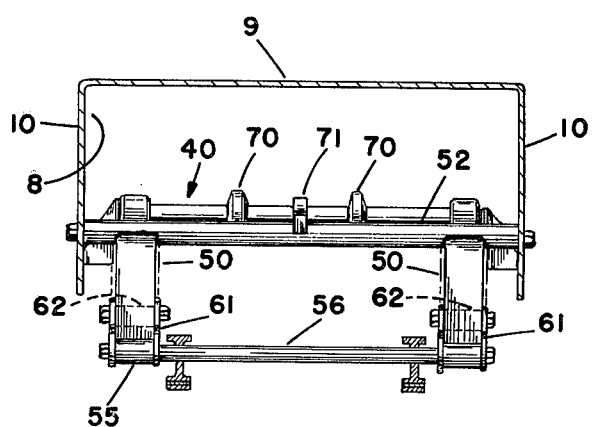
FIG. 4 is a rear end view of the rear track suspension system of the invention taken along lines 4—4 of FIG. 1.

Ground contact forces acting on the after portion of the slide rails 6 are transmitted to the aft spring/shock suspension assemblies 40 by rollers 55 journaled by appropriate means to a transverse bar 56 extending through and between the slide rails 6. As illustrated in FIGS. 1 and 4 the roller 55 moves upwardly and aft along the bottom surface of lever arm 50, reducing its leverage on that lever arm and increasing the mechanical advantage of the spring/shcok assembly 40 as the suspension is progressively depressed.

In both the forward and after suspension assemblies means are provided to prevent the cam rollers 35 and 55, and thus the slide rails 6, from falling away from the suspension apparatus if the snowmobile became airborn. In the case of the forward assembly 21, a guard 60 may be secured by any appropriate means to the lever arm 30 to prevent the roller 35 from falling any substantial distance from the cam surface 36. in the case of the after assembly 40, a shackle 61 is mounted to transverse bar 56 at the opposite ends of roller 55, and includes in its upper portion a smaller roller 62 which is journaled within the shackle to a cross pin 63 so that it can roll freely along the top surface of the lever arm 50. These shackles also assist in control of side forces acting on the rear of suspension system.

Included in the assembly but not essential to the invention are a pair of idler wheels 70 symmetrically positioned along the transverse member 44, and a centrally located idler guard 71 journaled to transverse member 52. These idlers help support the drive track on its return to the drive sprocket 3 when slack.

It should be noted that the forward and aft spring/shock units 22 and 42 may be of the type wherein the spring tension may be pre-loaded. This permits the ride to be adjusted for any particular type of use or terrain to be encountered by the user of the machine.

The structure described provides a novel means for programming and controlling the rate and character of spring/shock response to displacement of the snowmobile track. It has been tested commercially and has achieved broad acceptance as providing a generally more comfortable and superior ride.

While the principles of the invention have been described in connection with the above specific apparatus, it is to be clearly understood that this description is made only by way of example and not as a limitation to the scope of the invention.

I claim:

1. In a snowmobile having a chassis, an endless drive track, means for driving said track and means for supporting said track in engagement with said driving means and the ground, an improved means of suspending said track support means from said chassis, comprising:
    a front spring and shock absorber suspension assembly pivotally connected between said chassis and said track support means, and
    a rear spring and shock absorber suspension assembly pivotally connected between said chassis and said track support means,
    and separate linkage means operatively connecting each of said front and rear suspension assemblies to said track support means for displacing the spring and shock absorber elements of each of said assemblies in unison over the operating range thereof in response to displacement of said track support means with respect to said chassis, each of said separate linkage means including a lever arm and means associated with each of said lever arms for independently varying the mechanical advantage of each of said assemblies over its operating range in response to displacement of said track support means, and wherein one of said lever arms comprises a cam surface and said means for varying the mechanical advantage includes a low friction means attached to said track support means and bearing upon said cam surface.

2. The device of claim 1 wherein said low friction bearing means comprises a roller journaled to said track support means.

3. The device of claim 1 further including means for adjustably pre-loading said spring and shock absorber assemblies.

4. The device of claim 1 further including means for retaining said roller in close proximity to said lever arm.

5. The device of claim 1 wherein said lever arm of said forward suspension assembly is pivotally connected to said chassis and said forward coaxial spring and shock absorber assembly is pivotally connected to said track support means.

6. The device of claim 1 wherein said lever arm of said rear suspension assembly and said spring and shock absorber assembly are both pivotally connected to said chassis.

7. In a snowmobile comprising a chassis having an inverted U-shaped opening in the bottom thereof, a drive engine, a drive track and drive track support assembly disposed within said U-shaped opening and means for drivingly connecting said engine to said track, an improved means for suspending said drive track assembly within said U-shaped opening, comprising, means for positively linking said track support assembly to said chassis, comprising a pair of control arms having one end rigidly connected to a first transverse member pivotally connected to said chassis and the other end rigidly connected to a second transverse structural member pivotally mounted to said track support assembly, a front spring and shock absorber assembly, means for pivotally connecting one end of said front assembly to said second transverse member and means for pivotally connecting the other end of said front assembly to means linking said front assembly to said first transverse member, a rear spring and shock absorber assembly, means for pivotally connecting one end of said rear assembly to a third transverse member rotatably mounted to said chassis and means for pivotally connecting the other end of said rear assembly to means linking said rear assembly to a fourth transverse member rotatably mounted to said chassis, means associated with a front portion of said track support assembly and said front spring and shock linkage for operatively compressing said forward spring and shock assembly in a varying preselected relation to movement of said track relative to said chassis, and means associated with a rear portion of said track support assembly and said rear spring and shock linkage for operatively compressing said rear spring and shock assembly in a preselected relation to movement of said track relative to said chassis.

8. The device of claim 7 wherein said control arms, said first transverse member and said means linking said forward spring and shock assembly to said first transverse member combine to comprise a bell crank responsive to upward displacement of said track to compress said forward spring/shock unit.

9. The device of claim 7 wherein said spring and shock absorber assemblies are coaxial.

10. The device of claim 7 wherein said at least one of said front and rear spring and shock linking means comprises a lever arm, and said means for compressing said spring and shock unit comprises a low friction abutment means mounted for sliding contact with said lever arm.

11. The device of claim 10 wherein said lever arm comprises a cam surface operable with said abutment means to vary the mechanical advantage of said linkage in response to the position of said abutment means upon said lever arm.

12. In a snowmobile having a chassis, an endless drive track, means for driving said track and means for supporting said track in engagement with said driving means and the ground, an improved means for suspending said track support means from said chassis, comprising;

means pivotally connected to said track support means and said chassis for cushioning movement of said track support means relative to said chassis including a lever arm pivotally attached to one of said chassis and track support means, and abutment means attached to the other of said chassis and track support means and movably engaged upon a surface of said lever arm, wherein the surface of said lever arm so engaged comprises cam means for varying the mechanical advantage of said cushioning means as said abutment means moves over said cam means in response to displacement of said track support means with respect to said chassis.

13. The device of claim 12 wherein said cushioning means comprises a spring having one end pivotally connected to one of said chassis and track support means and the other end connected to said lever arm.

14. The device of claim 12 wherein said cushioning means comprises a shock absorber having one end attached to one of said chassis and track support means and the other end pivotally connected to said lever arm.

15. The device of claim 12 wherein said cushioning means comprises a coaxial spring and shock absorber assembly having one end attached to one of said chassis and track support means and the other end connected to said lever arm.

16. The device of claim 12 wherein said abutment means is a roller.

17. In a snowmobile having a chassis, an endless drive track, means for driving said track and means for supporting said track in engagement with said driving means and the ground, an improved means of suspending said track support means from said chassis, comprising:

a front suspension assembly pivotally connected between said chassis and said track support means including a coaxial spring and shock absorber assembly and an actuating lever arm pivotally attached thereto, a rear suspension assembly pivotally connected between said chassis and said track support means including a coaxial spring and shock absorber assembly and an actuating lever arm pivotally attached thereto;

and means for actuating each of said assemblies in response to vertical displacement of said track, said actuating means including front and rear means attached to said track support to slidingly engage and displace said lever arms in response to relative movement of said chassis and track, whereby the spring and shock absorber elements of each of said assemblies are actuated in unison over the entire operating range thereof.

* * * * *